(12) United States Patent  
Kubota

(10) Patent No.: US 6,272,405 B1  
(45) Date of Patent: Aug. 7, 2001

(54) APPARATUS AND METHOD FOR GUIDING VEHICLE AUTONOMOUSLY

(75) Inventor: Yosuke Kubota, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,721

(22) Filed: Jul. 8, 1999

(30) Foreign Application Priority Data

Jul. 8, 1998 (JP) .................................................. 10-207071

(51) Int. Cl.$^7$ .................................................. G01L 21/00
(52) U.S. Cl. ............................ 701/23; 701/26; 701/214; 342/357.02
(58) Field of Search ................................... 701/23, 25, 26, 701/28, 213, 214, 216; 342/357.01, 357.02, 357.03, 357.06, 357.13, 357.14, 357.17

(56) References Cited

U.S. PATENT DOCUMENTS

| 5,394,333 | * | 2/1995 | Kao | 701/200 |
| 5,729,457 | * | 3/1998 | Seymour | 701/215 |
| 5,938,704 | * | 8/1999 | Torii | 701/23 |
| 6,064,942 | * | 5/2000 | Johnson et al. | 701/213 |
| 6,070,673 | * | 6/2000 | Wendte | 172/2 |

\* cited by examiner

*Primary Examiner*—Tan Nguyen  
(74) *Attorney, Agent, or Firm*—Smith, Gambrell & Russell, LLP

(57) ABSTRACT

An apparatus for guiding a vehicle autonomously to a target point by finding a current position based on radio waives from satellites and comparing the current position with the target point comprises a means for storing a reference position data of a reference point whose accurate position is known, a means for obtaining a position data of the vehicle when the vehicle is located on the reference point, a means for obtaining a correction data by calculating a difference between the reference position data and the position data, and a means for correcting the current position by using the correction data to obtain a real position of the vehicle.

7 Claims, 4 Drawing Sheets

APPARATUS AND METHOD FOR GUIDING VEHICLE AUTONOMOUSLY

BACKGROUND OF THE INVENTION

1. Field of the Invention

The present invention relates to an apparatus and method for guiding an autonomous traveling vehicle which travels identifying its own positions based on positioning information sent from satellites.

2. Prior Art

Recently, autonomously traveling and working vehicles doing programmed works unmannedly have been put into practical use in various fields. Typical examples of such vehicles are lawn mowing vehicles used in golf courses, sports grounds, parks and other outdoor fields, cultivators, vehicles for dusting agricultural chemicals or fertilizer and vehicles for doing civil engineering works.

These autonomously traveling and working vehicles (hereinafter, referred to just autonomous vehicles) are autonomously operated using two techniques, one is a Global Positioning System (GPS) and the other is a dead reckoning navigation method. GPS is a technique for finding a vehicle position by radio waives received from positioning satellites and the dead reckoning navigation method is a technique for determining a current vehicle position based on a running direction detected by an earth magnetism sensor and a traveling distance detected by a wheel encoder.

However, GPS has positioning errors caused by the time difference between satellites and the radio receiver, orbital errors, delay of radio wave in ionized layer or in atmosphere, multipass and the like. Generally, it is said that GPS has positioning errors of several tens meters and even D-GPS having a higher positioning accuracy than GPS has errors of several centimeters to several meters.

SUMMARY OF THE INVENTION

It is an object of the present invention to provide an apparatus for guiding a vehicle with high accuracy by finding a correct position of the vehicle.

To achieve the objects, the present invention comprises a means for storing a reference position data of a reference point whose accurate position is known, a means for obtaining a position data of the vehicle when the vehicle is located on the reference point, a means for obtaining a correction data based on the reference position data and the position data, and a means for correcting a current position of the vehicle by using the correction data to obtain a real position of the vehicle.

DESCRIPTION OF PREFERRED EMBODIMENTS

Figure 1:
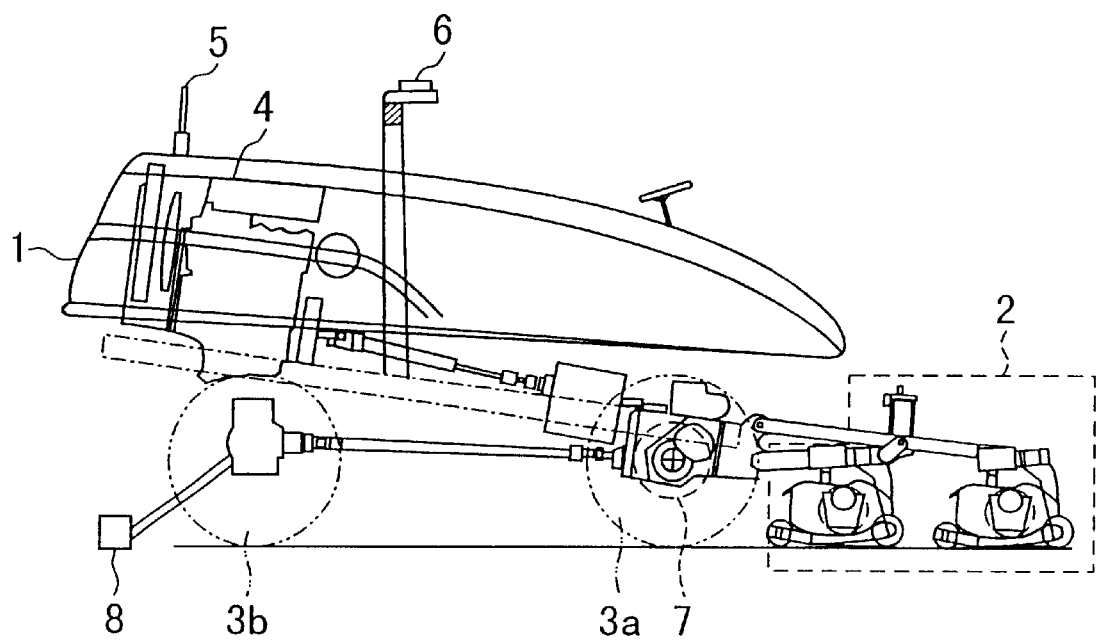
FIG. 1 is a schematic view of a lawn mowing vehicle according to an embodiment of the present invention.

FIG. 1 is a schematic side view of a lawn mowing vehicle according to an embodiment of the present invention. This vehicle has a capability of mowing lawn in golf courses, sports grounds and other fields while it runs autonomously. The autonomous operation is achieved by using two techniques, GPS (including D-GPS which will be described hereinafter) and a dead reckoning navigation method. Further, besides the autonomous traveling mode, this vehicle has a guide running mode in which the vehicle travels following a guide path buried underground and it is possible to choose either of these two running modes according to situations. The guide path has various types such as ones formed by magnets buried underground at a specified interval, ones formed by wires buried underground and the like. In this embodiment, the buried magnet type will be described.

The lawn mowing vehicle has a vehicle body 1, a lawn mowing device 2 and wheels 3a, 3b. The vehicle body 1 is equipped with a receiving antenna 4 for GPS, a receiving antenna 5 for radio communication and an earth magnetism sensor 6. The lawn mowing device 2 has a plurality of cutter units which are rotatably mounted on the vehicle body 1 so as to allow ascending and descending motion. The vehicle body 1 has a control apparatus including a GPS device and a dead reckoning navigation device. Further, a wheel encoder 7 is incorporated in an axle of the wheel 3a for detecting a rotation number of the wheel. Further, a magnetic sensor 8 is mounted at the rear portion of the vehicle body.

Figure 2:
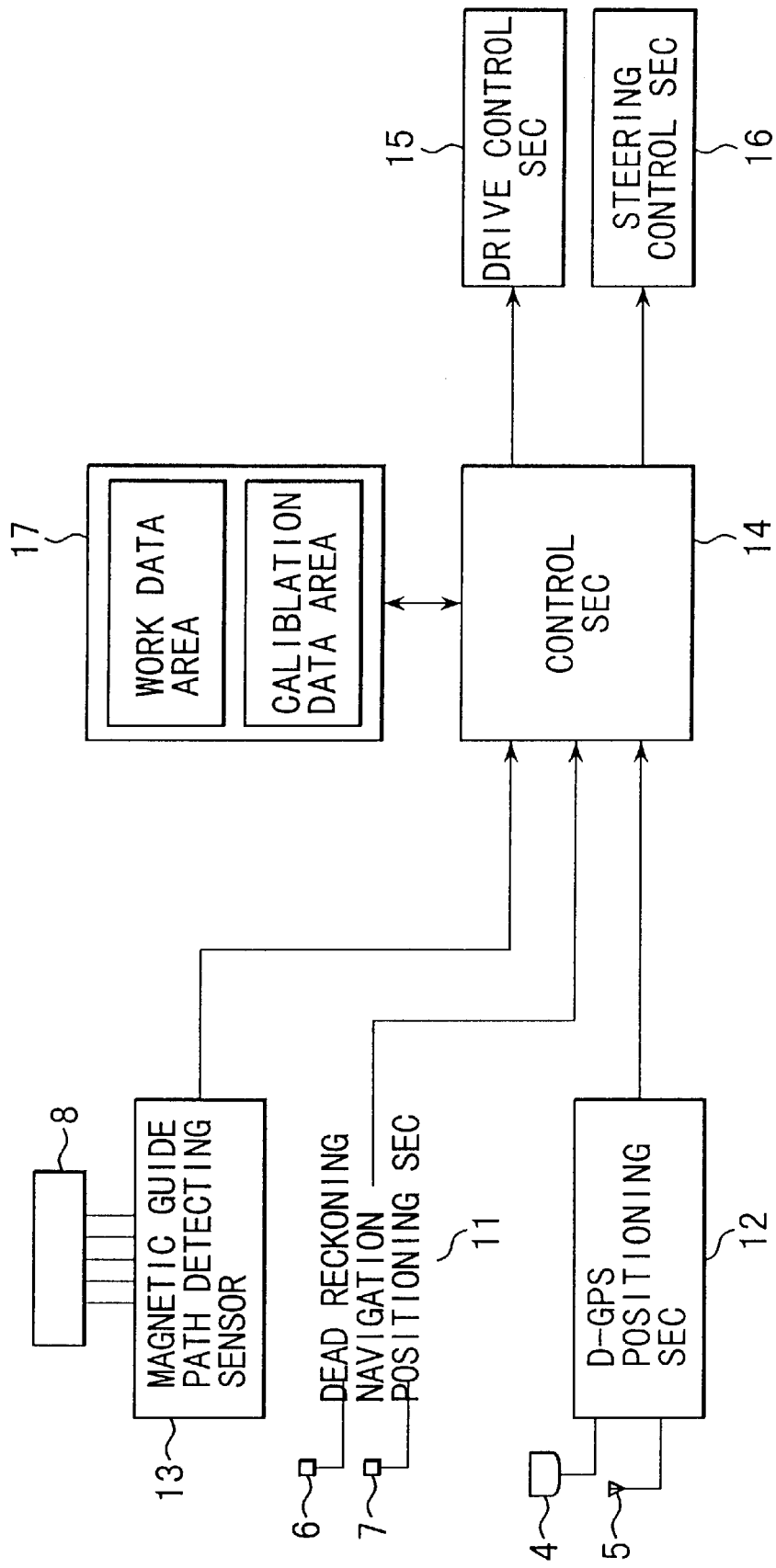
FIG. 2 is a block diagram of a control apparatus of a lawn mowing vehicle.

Referring to FIG. 2, numeral 11 denotes a dead reckoning navigation positioning section and numeral 12 denotes a Differential GPS (hereinafter referred to as D-GPS) positioning section. In the dead reckoning navigation positioning section 11, the current position of the vehicle is measured by calculating a running history originated from a certain reference point. The running history is a cumulative summation of distances measure by the wheel encoder 7 and running directions measure by the earth magnetism sensor 6.

In the D-GPS positioning section 12, the current position of the vehicle is measured based on radio waves from GPS satellites and differential information obtained from the stationary station. Radio waves from GPS satellites are received through the receiving antenna 4 for GPS and radio waves from the stationary station are received through the receiving antenna 5 for radio communication. As described before, the position data relied only upon radio waves from GPS satellites contains large errors. Hence, in order to delete errors in the same phase components of this position data, the position of the stationary station whose position is correctly known is observed to obtain a correction information. Thus obtained correction information is sent to the autonomous traveling vehicle. For example, according to the position method, synchronizing the receiver of the vehicle with the one of the stationary station so as to capture the same GPS satellites, the position data of the vehicle is reduced from the one of the stationary station, thereby the position of the vehicle can be accurately measured.

A magnetic guide path detecting section 13 detects the position of buried magnets based on output signals from a magnetic sensor 8. The vehicle is controlled such that the position of buried magnets agrees with the center of the vehicle body 1, thereby the vehicle can travel along the magnetic guide path.

In the autonomous traveling mode, a control section 14 controls a drive control section 15 and a steering control section 16 such that the vehicle travels toward a target point based on output signals from the D-GPS positioning section 12 and the dead reckoning navigation positioning section 11.

On the other hand, in the magnetic guide traveling mode, the control section 14 controls the vehicle such that it travels along the magnetic guide path based on output signals from the magnetic guide path detecting section 13. The drive control section 15 rotates a hydraulic motor (not shown) based on control variables which are transformed from output signals of the control section 14. The vehicle is propelled by the rotation of the hydraulic motor. Further, the steering control section 16 operates a steering mechanism (not shown) according to control variables which are transformed from output signals of the control section 14.

Further, when needed, the control section 14 accesses a data memory section 17 and reads out data therefrom or writes data therein. Also, the ascending and descending control of the lawn mowing device 2 is performed by the control section 14. Specifically, an ascending and descending mechanism is operated through an ascending and descending control section (not shown).

There are two data areas, a working data area and a calibration data area in the data memory section 17.

In the working data area, position data such as latitude, longitude and altitude with respect to target points on the running path are memorized. These target points are in the discrete relationship with each other and are memorized in the order of the running path. Also in the working data area, the work events and the like are memorized.

In the calibration data area, reference data and offset data are memorized. The reference data are position data indicating latitude, longitude and the like in reference points whose accurate position is already known. The offset data are difference data between the reference data and the D-GPS positioning data in a state that the vehicle is located in the reference point. The offset data, that is, the difference data indicate how much an actual position obtained by D-GPS is deviated from a real position. This offset data may be memorized as a plurality of different data corresponding to the measuring environments.

Figure 3:
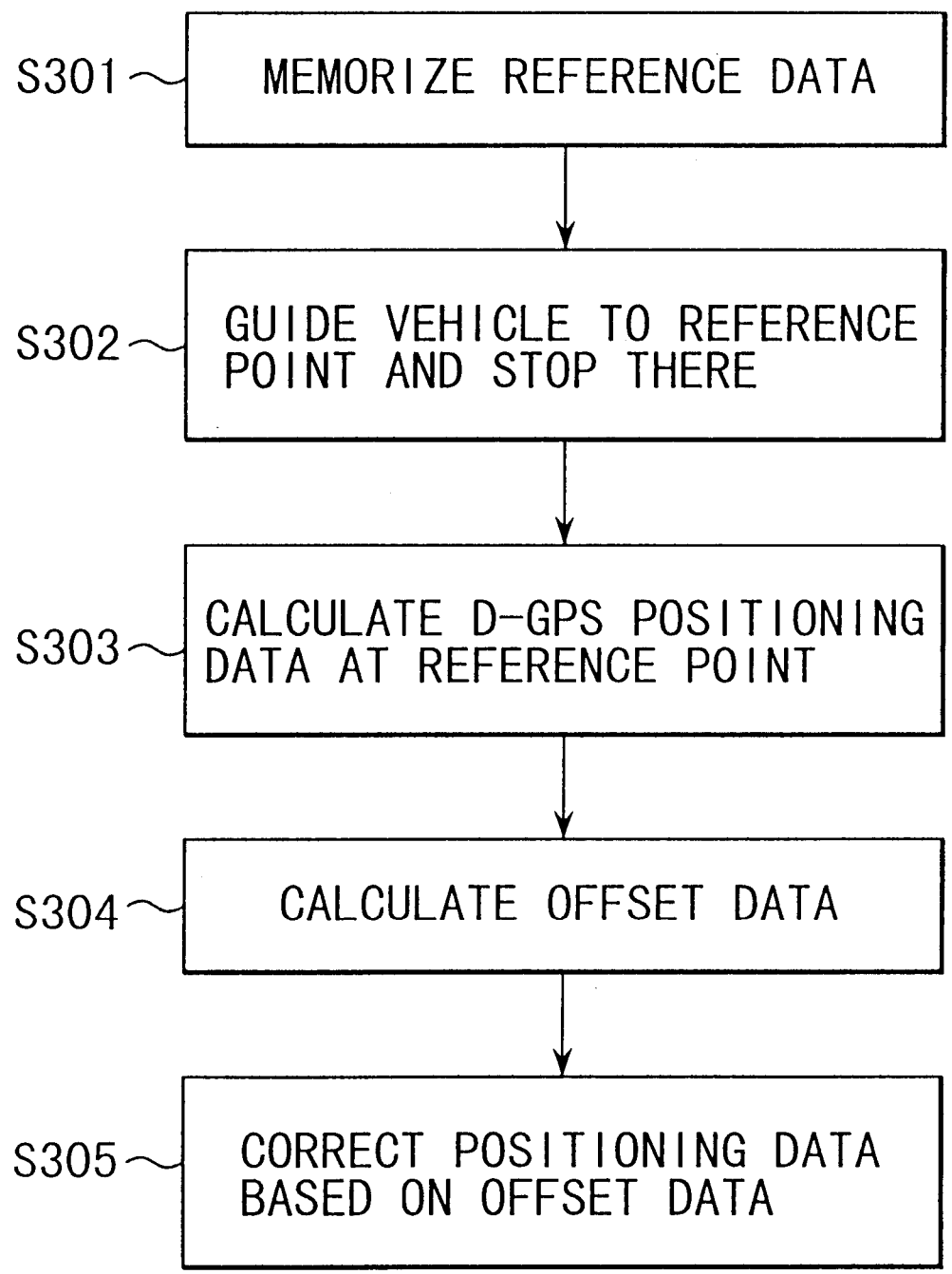
FIG. 3 is a flowchart showing steps of correcting positioning data based on offset data.

Next, the process in which the positioning data are corrected by the offset data will be described with reference to FIG. 3.

Figure 4:
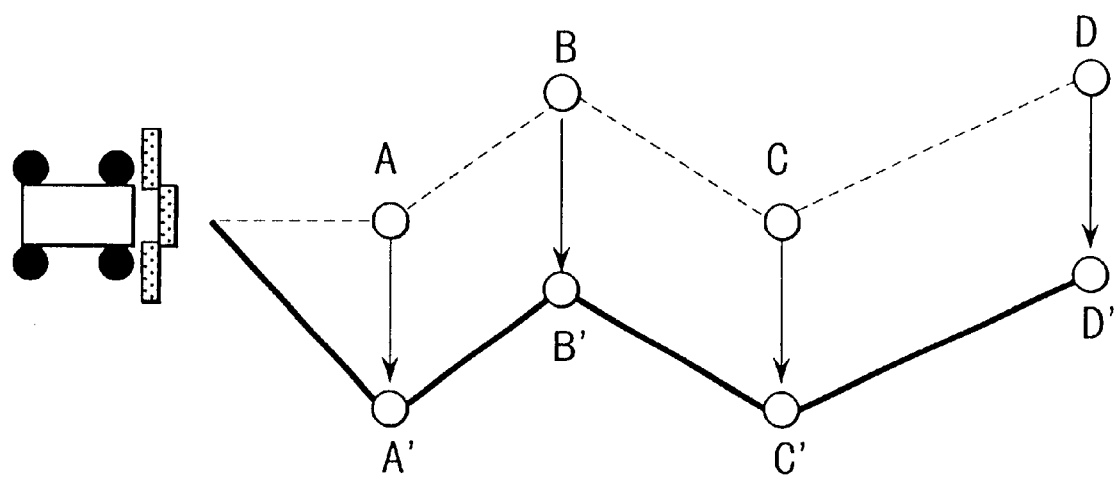
FIG. 4 is a schematic view for explaining an offset between a target point and a positioning point.

First, at a step S301, a reference point A is established as shown in FIG. 4 and its accurate position data, that is, latitude and longitude (altitude, too if necessary) are obtained. Since this position data is base data in calibrating respective target points at the autonomous running, it must be obtained accurately. This position data of the reference point A is store d as a reference data in the calibration data area of the data memory section 17. Further, this step should be preferably carried out when a manager introduces the vehicle and steps following the step S301 are preferably carried out every time when works are started.

Then, at a step S302, the vehicle is guided to the reference point A and is halted there. The guidance to the reference point A may be performed according to a magnetic guidance or may be performed according to a manual operation. I t should be noted that the following steps S303 and S304 are carried out when the vehicle is situated on the reference point A.

Figure 5:
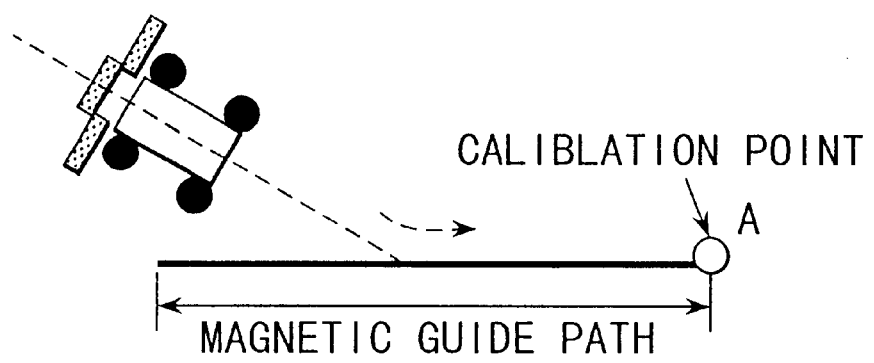
FIG. 5 is a schematic view showing a guidance to a reference point using a magnetic guide path.

As shown in FIG. 5, in case where the vehicle is guided by the magnetic guidance, a magnetic code for indicating an end of the guide pat h is established at an end portion of the guide path. The vehicle travels along the guide path based on detected signals from the magnetic sensor 8 and when the magnetic sensor 8 detects the magnetic code it stops there. Therefore, if the reference point A is established so as to agree with the end portion, the vehicle can be stopped correctly on the reference point A. In case of a manual guidance, an operator must stop the vehicle such that the vehicle correctly agrees with the marked reference point A.

At a step S303, the D-GPS positioning data is measured, in a state that the vehicle is situated on the reference point A, based on detected signals of the D-GPS positioning section 12. Since the D-GPS positioning data has a measuring error of several centimeters to several meters, the D-GPS positioning data presents a measuring point A' which is situated away from the reference point A. That is, as shown in FIG. 4, a deviation (offset) is generated between the reference point A and the measuring point A'.

At a step S304, the control section 14 calculates an offset data based on the reference data of the reference point A and the measuring data of the measuring point A'. The offset data is calculated in the following manner:

| latitude offset = | (latitude of reference data) − (latitude of measuring data) |
| longitude offset = | (longitude of reference data) − (longitude of measuring data) |

The calculated offset data is stored in the calibration area of the data memory section 17.

At a step S305, the control section 14 corrects a positioning data of a current position of the vehicle based on the offset data calculated at the step S304. The corrected positioning data is obtained as follows:

latitude of corrected current position=(latitude of current position)—(latitude offset)

longitude of corrected current position=(longitude of current position)—(longitude offset)

In case of reducing the reference data from the measuring data at the step S304, the calculation at the step S305 conversely becomes an addition.

When the autonomous traveling starts from the reference point A toward a first target point B, considering the case where no calibration is performed at the reference point A, due to the effect of the measuring errors, the vehicle travels toward a point B' which is located away from the point B in spite of the vehicle's intention of traveling toward the first target point B. As a result, the vehicle arrives at the point B' but not the point B. To prevent this, in the course of traveling toward the point B, the current position detected by the D-GPS positioning section 12 is corrected by the aforementioned offset data and the vehicle travels correctly toward the target point B while the corrected current position is compared with the position of the first target point B.

Similarly, in case of traveling from the first target point B to a second target point C, the vehicle correctly travels toward the point C by reducing the offset data from the current positioning data. The traveling from the target point C to a third target point D is done in the same manner.

The inventor of the present invention have attempted various experiments to raise the positioning accuracy of GPS. As a result of these experiments, it has been ascertained that the positioning data, no matter where it is measured, has a tendency to offset by some amount in some direction in case where there is no large difference in the measuring environment. Further, the result of experiments has cleared that this tendency increases under the condition that captured satellites are the same and the measuring place and the measuring time do not differ largely.

Accordingly, in case where the working vehicle travels autonomously in a given working area, if the measuring circumstance is substantially the same, i.e., the traveling range is not so big and the traveling time is not so long, respective positioning data can be corrected using the same offset data. As a result, it can be expected that the positioning accuracy at the autonomous traveling is largely improved by simple calculations.

In the foregoing embodiment, an example has been explained in which the calibration is executed at the reference point every time the autonomous traveling starts. Following variations can be considered.

A plurality of offset data are memorized in the calibration area of the data memory section 17. Respective offset data are memorized corresponding to the measuring circumstances such as, measuring time, reference points and captured satellites.

Example of Data Set I

Offset data: (X1, Y1)
Captured satellites: 3, 12, 13, 18
Time: 6:00
Reference point: A Example of Data Set II Offset data: (X2, Y2)
Captured satellites: 2, 6, 9, 11
Time: 16:00
Reference point: A These data sets may be the accumulation of data used in the past measuring. When the autonomous traveling is performed, the operator selects a data set whose measuring environment is similar to the present one and the data set is used as an offset data for that autonomous traveling.

Further, a plurality of offset data memorized in the data memory section 17 may be averaged to produce an offset data used for the autonomous traveling. Further, the offset data may be corrected by a coefficient determined according to the measuring environment.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for guiding a vehicle autonomously to a target position, comprising:

positioning means for obtaining a current position data of said vehicle based on a positioning information from radio waves received from positioning satellites;

memory means for storing a reference position data of reference point with a known accurate position;

deviation data obtaining means for obtaining a deviation data indicating how much said current position data is deviated from said reference position when said vehicle is located in said reference position; and running control means for guiding said vehicle autonomously to the target point based on said current position data, said target position and said deviation data.

2. The apparatus according to claim 1, further comprising:

measuring means for measuring said deviation data when said vehicle is located in said reference position by calculating offset value of latitude and longitude between said current position data and said reference position data, wherein said deviation data obtaining means obtains said deviation data from said measuring means.

3. The apparatus according to claim 1, further comprising:

data memory means for memorizing a plurality of deviation data corresponding to measuring circumstances including measuring time, reference points and captured, wherein said deviation data obtaining means obtains said deviation from said data memory means by selecting one of said deviation data whose measuring environment is similar to the present one.

4. The apparatus according to claim 1, further comprising:

said running control mean guides said vehicle autonomously to the target point by calculating a corrected data of said current position data by correcting based on said deviation data, and comparing said corrected data with said target position.

5. The apparatus according to claim 1, further comprising:

guiding means for guiding said vehicle to said reference point along a guide path furnished beforehand and leading to said reference point.

6. The apparatus according to claim 5, wherein:

said guide path is a buried magnetic guide path, said guiding means leads said vehicle to said reference point by detecting a magnetic code showing an end portion of said magnetic guide path.

7. A method of guiding a vehicle autonomously to a target point, comprising:

obtaining a current position data of said vehicle based on positioning information from satellites;

storing a reference position data of reference point with a known accurate position;

obtaining a deviation data indicating how much said current position data is deviated from said reference position when said vehicle is located in said reference position; and guiding said vehicle autonomously to the target point based on said current position data, said target position and said deviation data.

* * * * *